US009686443B2

(12) United States Patent
Shimatani

(10) Patent No.: US 9,686,443 B2
(45) Date of Patent: Jun. 20, 2017

(54) IMAGE READING DEVICE AND IMAGE FORMING APPARATUS

(71) Applicant: KYOCERA Document Solutions Inc., Osaka-shi, Osaka (JP)

(72) Inventor: Akira Shimatani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/077,796

(22) Filed: Mar. 22, 2016

(65) Prior Publication Data
US 2016/0286087 A1 Sep. 29, 2016

(30) Foreign Application Priority Data
Mar. 25, 2015 (JP) .................. 2015-062082

(51) Int. Cl.
H04N 1/48 (2006.01)
H04N 1/024 (2006.01)
H04N 1/192 (2006.01)
H04N 1/23 (2006.01)

(52) U.S. Cl.
CPC ............ H04N 1/484 (2013.01); H04N 1/024 (2013.01); H04N 1/192 (2013.01); H04N 1/233 (2013.01); H04N 2201/0094 (2013.01)

(58) Field of Classification Search
None
See application file for complete search history.

(56) References Cited

U.S. PATENT DOCUMENTS 5,136,388 A * 8/1992 Sano .................... G01R 31/308
348/187
2015/0235114 A1* 8/2015 Kubota .............. G06K 15/1878
358/1.9

FOREIGN PATENT DOCUMENTS

JP 2010056791 A 3/2010

OTHER PUBLICATIONS

Translation of JP 2010-056791.*

* cited by examiner

Primary Examiner — Mohammad Ghayour
Assistant Examiner — Lennin Rodriguezgonzale
(74) Attorney, Agent, or Firm — Alleman Hall Creasman & Tuttle LLP

(57) ABSTRACT

An image reading device includes an image sensor, a color reference portion, a test control portion, a standard distribution information storage portion, a type determination portion, and an abnormality notification portion. The image sensor is capable of outputting detection data of an amount of received light from each of a plurality of partial scanning areas, each at an individual channel. The test control portion is configured to cause the image sensor to operate under a plurality of test operation conditions different in resolution, when a document is not present. If a distribution state of the detection data at each channel acquired under each test operation condition does not match any of standard distribution information, the abnormality notification portion notifies an abnormality of another device related to the image sensor. The standard distribution information represents a standard distribution state of data at each channel under each test operation condition.

7 Claims, 11 Drawing Sheets

FIG. 7

| | Standard resolution | | | | | | | | Half resolution | | | | | | | |
|---|---|---|---|---|---|---|---|---|---|---|---|---|---|---|---|---|
| | Ch0 | | Ch1 | | Ch2 | | Ch3 | | Ch0 | | Ch1 | | Ch2 | | Ch3 | |
| | P1 | P2 | P1 | P2 | P1 | P2 | P1 | P2 | P1 | P3 | P2 | P1 | P2 | P1 | P2 | P1 | P2 |
| Tp1 | 1 | 1 | 1 | 1 | 1 | 1 | 1 | 1 | 1 | 0 | 0 | 1 | 0 | 1 | 0 | 1 | 0 |
| Tp2 | 1 | 1 | 1 | 1 | 1 | 1 | 1 | 0 | 1 | 0 | 0 | 1 | 0 | 1 | 0 | 1 | 0 |
| Tp3 | 1 | 1 | 1 | 1 | 1 | 1 | 0 | 0 | 1 | 1 | 0 | 1 | 0 | 1 | 0 | 0 | 0 |

| Standard resolution | | | | | | | | Half resolution | | | | | | | |
|---|---|---|---|---|---|---|---|---|---|---|---|---|---|---|---|
| Ch0 | | Ch1 | | Ch2 | | Ch3 | | Ch0 | | | Ch1 | | Ch2 | | Ch3 |
| P1 | P2 | P1 | P2 | P1 | P2 | P1 | P2 | P1 | P3 | P2 | P1 | P2 | P1 | P2 | P1 | P2 |
| 1 | 1 | 1 | 1 | 1 | 1 | 0 | 0 | 1 | 0 | 0 | 1 | 0 | 1 | 0 | 0 | 0 |

Ipt

IMAGE READING DEVICE AND IMAGE FORMING APPARATUS

INCORPORATION BY REFERENCE

This application is based upon and claims the benefit of priority from the corresponding Japanese Patent Application No. 2015-062082 filed on Mar. 25, 2015, the entire contents of which are incorporated herein by reference.

BACKGROUND

The present disclosure relates to an image reading device and an image forming apparatus including the image reading device.

In general, in an image reading device, a contact image sensor (CIS) is known to be used as an image sensor for reading an image of a document. In addition, a CIS module having a plurality of channels may be adopted for improving a speed at which an image is read.

The CIS module having the plurality of channels emits light to a main-scanning area along one straight line. Furthermore, the CIS module having the plurality of channels is able to output detection data of an amount of received light from each of a plurality of partial scanning areas each forming a part of the main-scanning area, at an individual channel for each partial scanning area. The detection data is data representing the amount of the received light and also image data representing the density of an image in the main-scanning area.

At the time of maintenance of the image reading device, etc., the CIS module having the plurality of channels may be replaced with a compatible module different in type from the module used so far. In this case, the conditions of an image reading process may need to be changed in accordance with the type of the CIS module after the replacement.

Conventionally, it is known that the type of the CIS module is determined in accordance with the durability of a period when an image signal outputted from the CIS module having the plurality of channels is acquired. Accordingly, the conditions of the image reading process can be changed in accordance with the determined type of the CIS module.

SUMMARY

An image reading device according to one aspect of the present disclosure includes an image sensor, a color reference portion, a test control portion, a standard distribution information storage portion, a type determination portion, and an abnormality notification portion. The image sensor is a sensor capable of emitting light to a main-scanning area along one straight line and outputting detection data of an amount of received light from each of a plurality of partial scanning areas each forming a part of the main-scanning area at an individual channel for each of the partial scanning area. The color reference portion is a portion having a reference surface that is formed along the main-scanning area and has a predetermined color. The test control portion is a control portion configured to cause the image sensor to operate under a plurality of test operation conditions different in resolution, in a state where a document is not present in the main-scanning area. The standard distribution information storage portion is a storage portion configured to store standard distribution information. The standard distribution information is information representing a standard distribution state of data at each of the channels under each of the test operation conditions. The standard distribution information is associated with each of a plurality of types of the image sensors. The type determination portion is configured to determine a type of the image sensor by collating the standard distribution information with a distribution state of the detection data at each of the channels acquired under each of the test operation conditions. The abnormality notification portion is configured to notify an abnormality of another device related to the image sensor if the distribution state of the detection data at each of the channels acquired under each of the test operation conditions does not match any of the standard distribution information.

An image forming apparatus according to another aspect of the present disclosure includes: the image reading device according to the one aspect of the present disclosure; and an image forming portion. The image forming portion is configured to form an image corresponding to the detection data acquired by the image reading device, on a recording medium.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a diagram representing an example of standard distribution data stored in advance in the image reading device according to the embodiment of the present disclosure.

FIG. 9 is a diagram representing an example of test distribution data acquired when the portion other than the image sensor in the image reading device according to the embodiment of the present disclosure is abnormal.

DETAILED DESCRIPTION

Figure 1:
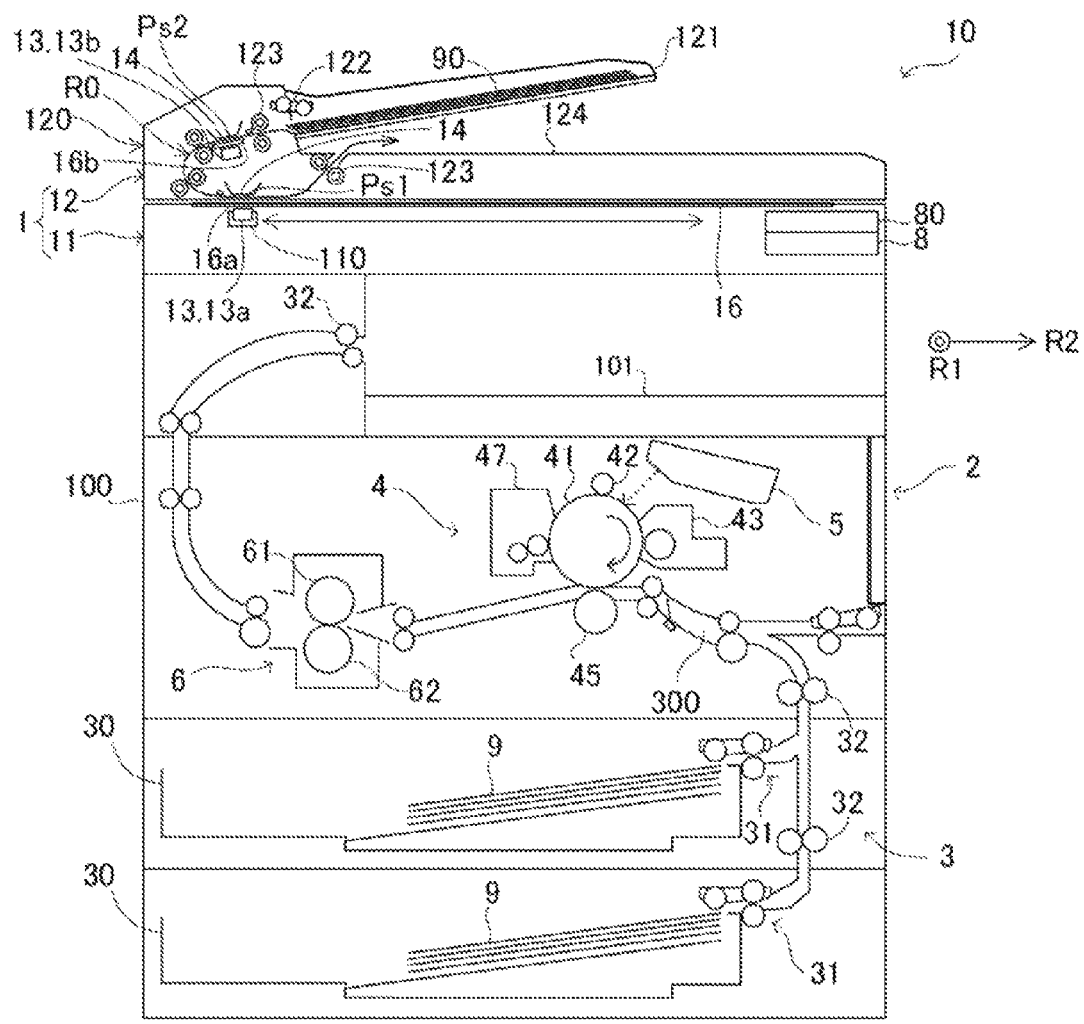
FIG. 1 is a configuration diagram of an image forming apparatus including an image reading device according to an embodiment of the present disclosure.

Hereinafter, an embodiment of the present disclosure will be described with reference to the accompanying drawings. It should be noted that the following embodiment is an example embodying the present disclosure and does not have nature of limiting the technical scope of the present disclosure.

[Configuration of Apparatus]

First, the configurations of an image reading device 1 according to the embodiment and an image forming apparatus 10 including the image reading device 1 will be described with reference to FIGS. 1 to 4. The image forming apparatus 10 includes a main body portion 2 and the image reading device 1. In addition, the image forming apparatus 10 also includes an operation display portion 80 and a control portion 8 that controls each device of the main body portion 2 and the image reading device 1.

For example, the image forming apparatus 10 is a copying machine, a printer or a facsimile having the function of a copying machine, a multifunction peripheral having a plurality of image processing functions including an image reading function, or the like.

<Image Reading Device 1>

As shown in FIG. 1, the image reading device 1 includes a document scanning unit 11 and a document table cover 12. The document table cover 12 is supported so as to be rotatable relative to the document scanning unit 11. The document scanning unit 11 includes a transparent document table 16, and the document table cover 12 is rotatable between a closed position at which the document table cover 12 covers the document table 16 and an open position at which the document table cover 12 opens the document table 16.

The document table 16 is a portion on which a document 90 that is an image reading target is placed. In general, the document table 16 is referred to as platen glass.

The document scanning unit 11 further includes a first image sensor 13a and a scanning mechanism 110, etc. In the following description, one horizontal direction and another horizontal direction orthogonal to the one horizontal direction are referred to as main-scanning direction R1 and sub-scanning direction R2, respectively.

The first image sensor 13a is a sensor that reads an image of one line along the main-scanning direction R1 on the document 90 and outputs image data corresponding to the read image. The scanning mechanism 110 is a mechanism that causes the first image sensor 13a to reciprocate at a position close to the document table 16 and along the sub-scanning direction R2.

The first image sensor 13a reads an image on the lower surface of the document 90 placed on the document table 16 while moving along the sub-scanning direction R2, and outputs image data corresponding to the read image.

An ADF 120 is incorporated into the document table cover 12. The ADF 120 includes a document supply tray 121, a document sending-out mechanism 122, a document conveying mechanism 123, and a document discharge tray 124. The document sending-out mechanism 122 sends out documents 90, one by one, which are set in the document supply tray 121, to a document conveyance path R0.

The document conveyance path R0 is formed along a predetermined path passing through: a first position Ps1 along a first contact portion 16a that is a part of the document table 16; and a second position Ps2 within the document table cover 12.

A transparent second contact portion 16b is fixed along the second position Ps2. The scanning mechanism 110 is able to hold the first image sensor 13a at a position opposed to the first position Ps1. The first image sensor 13a is held so as to be opposed to the first position Ps1 across the transparent first contact portion 16a.

The document conveying mechanism 123 is a mechanism that conveys the document 90 sent out from the document sending-out mechanism 122, along the document conveyance path R0, and further discharges the document 90 to the document discharge tray 124. The document conveying mechanism 123 includes a roller pair that nips the document 90 and rotates, and a motor that rotationally drives one roller of the roller pair, etc. The document conveying mechanism 123 is an example of a document conveying portion.

The main-scanning direction R1 is a direction orthogonal to a conveyance direction of the document 90 on the document conveyance path R0. In the following description, the upstream side and the downstream side in the conveyance direction of the document 90 on the document conveyance path R0 are referred to merely as conveyance upstream side and conveyance downstream side.

Figure 2:
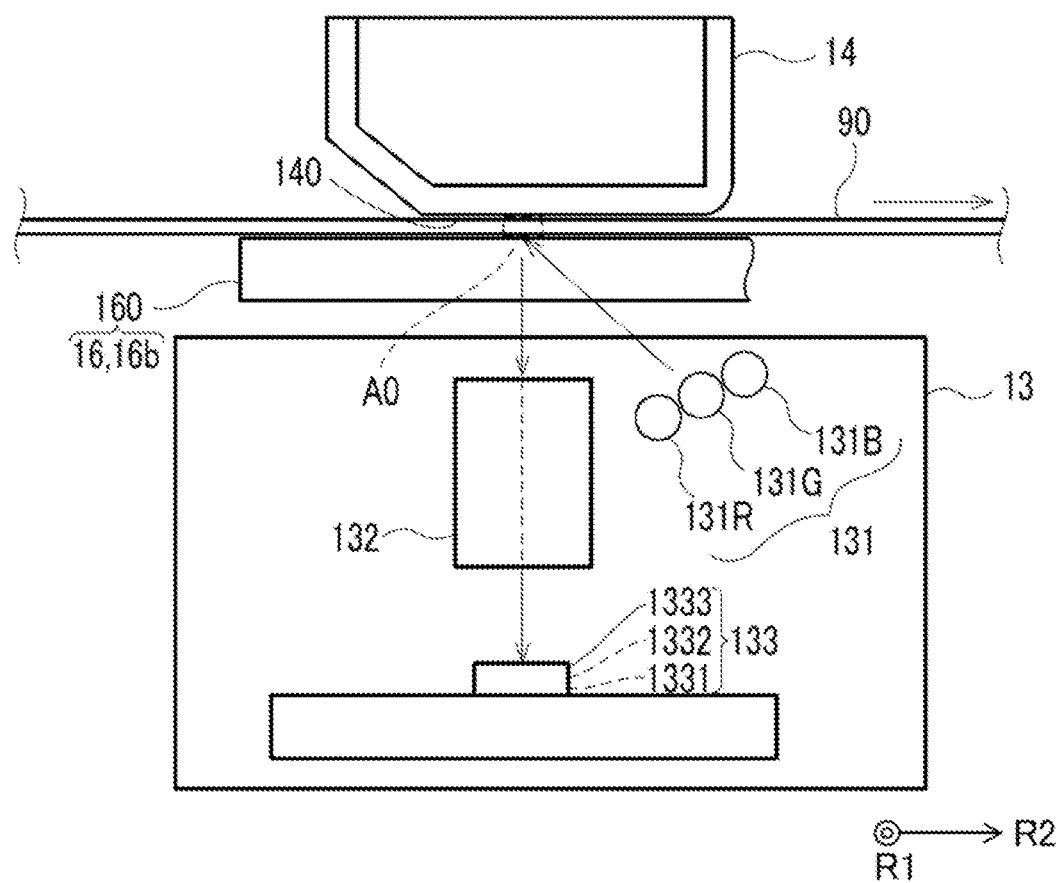
FIG. 2 is a configuration diagram of an image sensor and a peripheral area thereof in the image reading device according to the embodiment of the present disclosure.

In the example shown in FIGS. 1 and 2, on the document conveyance path R0, the first position Ps1 is located at the conveyance downstream side with respect to the second position Ps2. In other words, the second position Ps2 is located at the conveyance upstream side with respect to the first position Ps1. However, the second position Ps2 may be located at the conveyance downstream side with respect to the first position Ps1.

The ADF 120 operates in a state where the document table cover 12 is present at the closed position and the first image sensor 13a is opposed to the first position Ps1.

A second image sensor 13b is provided within the document table cover 12. The second image sensor 13b is fixed to a position opposed to the second position Ps2 on the document conveyance path R0. The second image sensor 13b is fixed so as to be opposed to the second position Ps2 across the transparent second contact portion 16b.

The first image sensor 13a reads an image on a first surface of the moving document 90 at the first position Ps1, and outputs image data corresponding to the read image. Meanwhile, the second image sensor 13b reads an image on a second surface of the moving document 90 at the second position Ps2, and outputs image data corresponding to the read image. The second surface is a surface opposite to the first surface.

In the present embodiment, the first image sensor 13a and the second image sensor 13b are each a CIS module having a plurality of channels. In the following description, the first image sensor 13a and the second image sensor 13b are collectively referred to as image sensor 13. The image sensor 13 is an example of an image sensor module having a plurality of channels. The image sensor 13 may be composed of one image sensor module having a length over the entirety of an image reading range in the main-scanning direction R1. In addition, the image sensor 13 may be composed of a plurality of image sensor modules each having a length shorter than the length of the entirety of the image reading range and arranged along the main-scanning direction R1.

Figure 3:
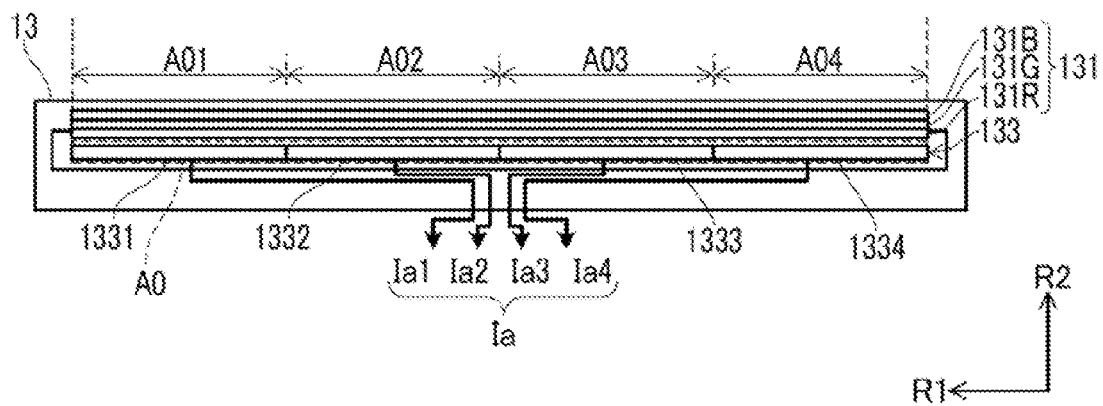
FIG. 3 is a schematic plan view of the interior of the image sensor in the image reading device according to the embodiment of the present disclosure.

As shown in FIGS. 2 and 3, the image sensor 13 includes a plurality of light-emitting portions 131, a lens 132, and a light amount sensor 133. The plurality of light-emitting portions 131, the lens 132, and the light amount sensor 133 are formed so as to extend along the main-scanning direction R1.

The light-emitting portions 131 include a red light-emitting portion 131R, a green light-emitting portion 131G, and a blue light-emitting portion 131B. Each of the respective light-emitting portions 131 and the lens 132 are formed in a bar shape along the main-scanning direction R1. The red light-emitting portion 131R, the green light-emitting portion 131G, and the blue light-emitting portion 131B have emission colors different from each other, and are able to individually emit light.

Each light-emitting portion 131 emits light to a main-scanning area A0 along one straight line. The main-scanning area A0 is an area along the main-scanning direction R1.

The light amount sensor 133 receives light from the main-scanning area A0 and outputs detection data of the amount of the received light. The detection data is data representing the amount of the received light and also data representing the density of an image in the main-scanning area A0.

That is, in the case where the detection data is data in which a value increases as the amount of the received light increases, the detection data represents that the density of the image in the main-scanning area A0 increases as the value decreases. Hereinafter, the detection data outputted directly from the light amount sensor 133 is referred to as primary image data Ia. The primary image data Ia is analog data.

At the first image sensor 13a located at the first position Ps1, the main-scanning area A0 is an area on the first surface of the document 90 moving on the document conveyance path R0. In addition, at the second image sensor 13b, the main-scanning area A0 is an area on the second surface of the document 90 moving on the document conveyance path R0. Moreover, at the first image sensor 13a being moved by the scanning mechanism 110, the main-scanning area A0 is an area on the lower surface of the document 90 placed on the document table 16.

For example, each light-emitting portion 131 may be an LED array including a plurality of light-emitting diodes arranged along the main-scanning direction R1. In addition, each light-emitting portion 131 may include one or a plurality of light sources, and an optical system, such as a cylindrical lens and a light guide body, which converts emitted light of each light source to sheet-like light.

The light amount sensor 133 includes a plurality of single-channel light amount sensors 1331 to 1334 arranged in series along the main-scanning direction R1. The respective single-channel light amount sensors 1331 to 1334 are light amount sensors that receive light from partial scanning areas A01 to A04 each forming a part of the main-scanning area A0, and output detection data of the amounts of the received light. The plurality of single-channel light amount sensors 1331 to 1334 perform, in parallel, processes from the light reception to the output of the detection data.

The partial scanning areas A01 to A04 are a plurality of areas into which the main-scanning area A0 is divided. In the example shown in FIG. 3, the light amount sensor 133 includes the four single-channel light amount sensors 1331 to 1334. The respective single-channel light amount sensors 1331 to 1334 receive light from the four partial scanning areas A01 to A04 of the main-scanning area A0 and output detection data of the amounts of the received light. The light amount sensor 133 may include two, three, five, or more single-channel light amount sensors that are of the same type as the above single-channel light amount sensors.

The respective single-channel light amount sensors 1331 to 1334 output, as the detection data of the amounts of the received light, primary image partial data Ia1 to Ia4 each forming a part of the primary image data Ia. Each of the primary image partial data Ia1 to Ia4 is a data sequence of a plurality of pixels in each of the partial scanning areas A01 to A04.

Each of the single-channel light amount sensors 1331 to 1334 includes a plurality of photoelectric conversion elements arranged along the main-scanning direction R1. In general, the photoelectric conversion elements are CMOS image sensors. Each photoelectric conversion element of each of the single-channel light amount sensors 1331 to 1334 detects the amount of light emitted from each pixel in the main-scanning area A0. That is, the respective photoelectric conversion elements correspond to a plurality of pixels, respectively. The respective single-channel light amount sensors 1331 to 1334 output detection data of the amounts of the light from the respective pixels, as the primary image partial data Ia1 to Ia4.

As described above, the image sensor 13 emits light to the main-scanning area A0 along the one straight line. Furthermore, the image sensor 13 is able to output the detection data of the amount of the received light from each of the plurality of the partial scanning areas A01 to A04 each forming a part of the main-scanning area A0, at an individual channel for each of the partial scanning areas A01 to A04.

In the following description, the first contact portion 16a opposed to the first image sensor 13a located at the first position Ps1, the second contact portion 16b opposed to the second image sensor 13b, and a part of the document table 16 which part is opposed to the first image sensor 13a being moved by the scanning mechanism 110 are collectively referred to as contact portion 160.

As shown in FIG. 2, the light-emitting portions 131 of the image sensor 13 emit light through the contact portion 160 to the main-scanning area A0 including a part of the front surface of the document 90.

The lens 132 converges light emitted from the main-scanning area A0 on the document 90, to a light-receiving portion of the light amount sensor 133.

The light amount sensor 133 reads an image of each one line along the main-scanning direction R1, on the document 90, by sequentially detecting the amount of light emitted from the main-scanning area A0 including the part of the front surface of the document 90 moving relatively along the sub-scanning direction R2.

In a step of reading the image of the document 90, the red light-emitting portion 131R, the green light-emitting portion 131G, and the blue light-emitting portion 131B light up in order, so that red light, green light, and blue light are emitted to the main-scanning area A0 in order. Thus, the light amount sensor 133 sequentially outputs three primary image data Ia representing the densities of a red image, a green image, and a blue image in the main-scanning area A0, respectively. Accordingly, it is possible to read the image of the document 90 as a color image.

In the case where the image of the document 90 is read as a monochrome image, the red light-emitting portion 131R, the green light-emitting portion 131G, and the blue light-emitting portion 131B light up simultaneously, so that white light is emitted to the main-scanning area A0. Thus, the light amount sensor 133 sequentially outputs single-color primary image data Ia representing the density of an image in the main-scanning area A0. Accordingly, it is possible to read the image of the document 90 as a monochrome image. The monochrome image may be synthesized from images of the three colors.

At each of the first position Ps1 and the second position Ps2, a color reference portion 14 having a reference surface 140 is provided. The reference surface 140 is a surface that is formed along the main-scanning area A0 and has a predetermined color.

The first contact portion 16a and the color reference portion 14 are disposed at both sides of the first position Ps1 on the document conveyance path R0 so as to be opposed to each other. The first image sensor 13a is opposed to the reference surface 140 across the transparent first contact portion 16a. Similarly, the second contact portion 16b and the color reference portion 14 are disposed at both sides of the second position Ps2 on the document conveyance path R0 so as to be opposed to each other. The second image sensor 13b is opposed to the reference surface 140 across the transparent second contact portion 16b.

The reference surface 140 of each color reference portion 14 is a surface having a high light reflectivity and having a uniform reference color. In general, the reference color is white. The reference color may be a pale yellowish color.

The image reading device 1 performs an image sensor adjustment step at predetermined timing. In the image sensor adjustment step, the first image sensor 13a operates when the document 90 is not present at the first position Ps1. Furthermore, the received light amount detection gain of the first image sensor 13a is automatically adjusted on the basis of comparison between the output data of the first image sensor 13a and preset brightness reference data.

Similarly, in the image sensor adjustment step, the second image sensor 13b operates when the document 90 is not present at the second position Ps2. Furthermore, the received light amount detection gain of the second image sensor 13b is automatically adjusted on the basis of comparison between the output data of the second image sensor 13b and the brightness reference data.

<Main Body Portion of Image Forming Apparatus 10>

The main body portion 2 of the image forming apparatus 10 includes a device that forms an image corresponding to the image data outputted from each of the first image sensor 13a and the second image sensor 13b, on a sheet-like recording medium 9. The recording medium 9 is a sheet-like image forming medium such as paper, coated paper, a postcard, an envelope, an OHP sheet, or the like.

The main body portion 2 of the image forming apparatus 10 includes sheet feed portions 30, a sheet conveying portion 3, an image forming portion 4, an optical scanning portion 5, and a fixing portion 6, etc. The image forming apparatus 10 shown in FIG. 1 is an electrophotographic type image forming apparatus. The image forming apparatus 10 may be an image forming apparatus of another type such as an ink-jet type.

Each sheet feed portion 30 is configured such that a plurality of recording media 9 can be placed in a stacked manner thereon. The sheet conveying portion 3 includes sheet sending-out mechanisms 31 and sheet conveying mechanisms 32.

Each sheet sending-out mechanism 31 includes a roller that rotates in contact with the recording medium 9, and sends out the recording medium 9 from the sheet feed portion 30 toward a sheet conveyance path 300. Each sheet conveying mechanism 32 conveys the recording medium 9 along the sheet conveyance path 300. Accordingly, the recording medium 9 passes through the image forming portion 4 and the fixing portion 6 and then is discharged through a discharge port of the sheet conveyance path 300 onto a sheet discharge tray 101.

The image forming portion 4 includes a drum-shaped photosensitive member 41, a charging device 42, a developing device 43, a transfer device 45, and a cleaning device 47, etc. The photosensitive member 41 is an example of an image carrier that carries an image of a developer.

The photosensitive member 41 rotates, and the charging device 42 uniformly charges the surface of the photosensitive member 41. Furthermore, the optical scanning portion 5 performs scanning with laser light thereby to write an electrostatic latent image onto the charged surface of the photosensitive member 41. Moreover, the developing device 43 supplies the developer to the photosensitive member 41 thereby to develop the electrostatic latent image into an image of the developer. The developer is supplied to the developing device 43 from a developer supply portion that is not shown.

Furthermore, the transfer device 45 transfers the image of the developer on the surface of the photosensitive member 41, onto the recording medium 9 moving between the photosensitive member 41 and the transfer device 45. In addition, the cleaning device 47 removes the developer remaining on the surface of the photosensitive member 41.

The fixing portion 6 sends out the recording medium 9, on which the image has been formed, to the subsequent step while nipping the recording medium 9 between a heating roller 61 housing a heater and a pressure roller 62. By so doing, the fixing portion 6 heats the developer on the recording medium 9 to fix the image on the recording medium 9.

The operation display portion 80 is, for example, an operation input portion including a touch panel and an operation button, etc., and is also a display portion including a liquid crystal panel and a notification lamp, etc.

The control portion 8 controls various electronic devices of the image forming apparatus 10 on the basis of input information inputted through the operation display portion 80 and detection results of various sensors. Furthermore, the control portion 8 also performs image processing on the image data outputted from each of the first image sensor 13a and the second image sensor 13b.

Figure 4:
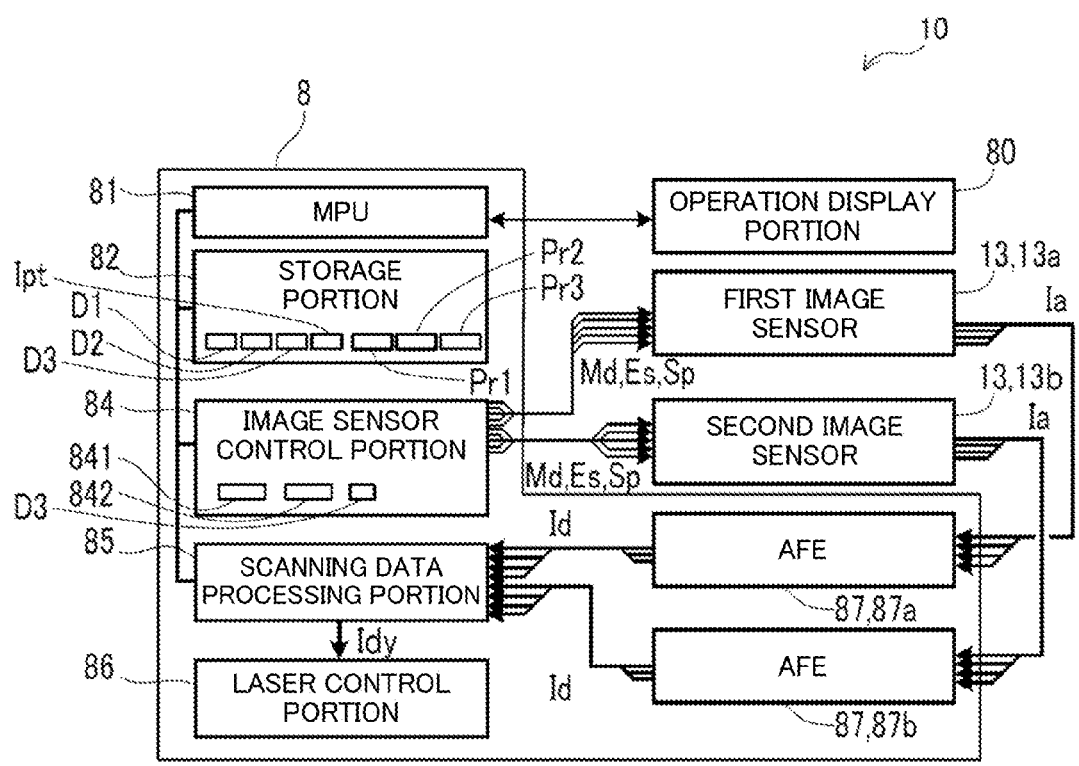
FIG. 4 is a block diagram of control-related devices of the image forming apparatus including the image reading device according to the embodiment of the present disclosure.

For example, as shown in FIG. 4, the control portion 8 includes a micro processor unit (MPU) 81, a storage portion 82, an image sensor control portion 84, a scanning data processing portion 85, and an analog front end (AFE) 87, etc. The control portion 8 further includes a laser control portion 86 that achieves a control function at the main body portion 2 side.

The MPU 81 is a processor that performs various calculation processes. The storage portion 82 is a non-transitory computer-readable non-volatile information storage medium in which a program for causing the MPU 81 to perform various processes, and other information are stored in advance. The storage portion 82 is an information storage medium from and into which various kinds of information can be read and written by the MPU 81.

The control portion 8 centrally controls the image forming apparatus 10 by the MPU 81 executing various programs stored in advance in the storage portion 82.

The image sensor control portion 84 controls operation timing of the image sensor 13. The image sensor control portion 84 includes a normal control portion 841 and a test control portion 842.

The normal control portion 841 causes the image sensor 13 to operate when an image reading process of reading the image of the document 90 is performed. For example, the normal control portion 841 causes the document sending-out mechanism 122 and the document conveying mechanism 123 to operate when a predetermined first start condition is satisfied. Accordingly, the document 90 is conveyed along the document conveyance path R0.

In addition, the normal control portion 841 causes the scanning mechanism 110 to operate when a predetermined second start condition is satisfied. Accordingly, the first image sensor 13a moves along the sub-scanning direction R2.

For example, the first start condition is that a predetermined start operation is performed on the operation display portion 80 in a state where the document table cover 12 is closed and a sensor that is not shown detects that the document 90 is set on the document supply tray 121.

The second start condition is that the start operation is performed on the operation display portion 80 in a state where the document table cover 12 is closed and the sensor that is not shown detects that no document 90 is set on the document supply tray 121.

Furthermore, when the first start condition or the second start condition is satisfied, the normal control portion 841 causes the red light-emitting portion 131R, the green light-emitting portion 131G, and the blue light-emitting portion 131B to emit light with desired brightness, and outputs a mode signal Md and a start pulse signal Sp to the light amount sensor 133.

When a condition for starting a later-described image sensor test process is satisfied, the test control portion 842 causes the red light-emitting portion 131R, the green light-emitting portion 131G, and the blue light-emitting portion 131B to emit light with desired brightness, and also outputs the mode signal Md and the start pulse signal Sp to the light amount sensor 133.

For example, each of the normal control portion 841 and the test control portion 842 outputs a light emission signal Es to each of the red light-emitting portion 131R, the green light-emitting portion 131G, and the blue light-emitting portion 131B of the image sensor 13 at necessary timing. Each of the normal control portion 841 and the test control portion 842 individually outputs a red light emission signal Es-R for causing the red light-emitting portion 131R to emit light with desired brightness, a green light emission signal Es-G for causing the green light-emitting portion 131G to emit light with desired brightness, and a blue light emission signal Es-B for causing the blue light-emitting portion 131B to emit light with desired brightness.

Furthermore, each of the normal control portion 841 and the test control portion 842 controls timings of light reception and output of the primary image data Ia by the light amount sensor 133. Each of the normal control portion 841 and the test control portion 842 outputs the start pulse signal Sp to the light amount sensor 133 at necessary timing.

The start pulse signal Sp is a control signal for causing the light amount sensor 133 to output the primary image data Ia corresponding to the amount of received light in a period from the time when the start pulse signal Sp is outputted last to the time when the start pulse signal Sp is presently outputted. The start pulse signal Sp is also a control signal for initializing the light amount sensor 133 and starting new light reception. The primary image data Ia is transferred to the AFE 87.

The mode signal Md is a signal for designating, to the light amount sensor 133, a resolution for detection of the amount of light in the main-scanning area A0, that is, a resolution for reading of the image in the main-scanning area A0. For example, the light amount sensor 133 operates in either one of a standard resolution mode and a half resolution mode, in accordance with the content of the mode signal Md. The half resolution mode is an operating mode in which the image is read at a resolution that is half the resolution in the standard resolution mode.

For example, the standard resolution mode is an operating mode in which the image in the main-scanning area A0 is read at a resolution of 600 dpi. In this case, the half resolution mode is an operating mode in which the image in the main-scanning area A0 is read at a resolution of 300 dpi.

Meanwhile, the test control portion 842 of the image sensor control portion 84 performs a process of causing the image sensor 13 to operate under later-described test operation conditions. The details thereof will be described later.

The AFE 87 is a circuit that performs predetermined data processing on the primary image data Ia outputted from the image sensor 13. The data processing by the AFE 87 includes a level shift process of adjusting an offset level of the primary image data Ia, an amplification process of amplifying the primary image data Ia, and an A/D conversion process of converting the analog primary image data Ia to digital secondary image data Id.

That is, the AFE 87 converts the primary image partial data Ia1 to secondary image partial data Id1, converts the primary image partial data Ia2 to secondary image partial data Id2, converts the primary image partial data Ia3 to secondary image partial data Id3, and converts the primary image partial data Ia4 to secondary image partial data Id4.

In the example shown in FIG. 4, the AFE 87 includes a first AFE 87a and a second AFE 87b. The first AFE 87a converts the primary image data Ia outputted from the first image sensor 13a, to secondary image data Id. The second AFE 87b converts the primary image data Ia outputted from the second image sensor 13b, to secondary image data Id.

Figure 5:
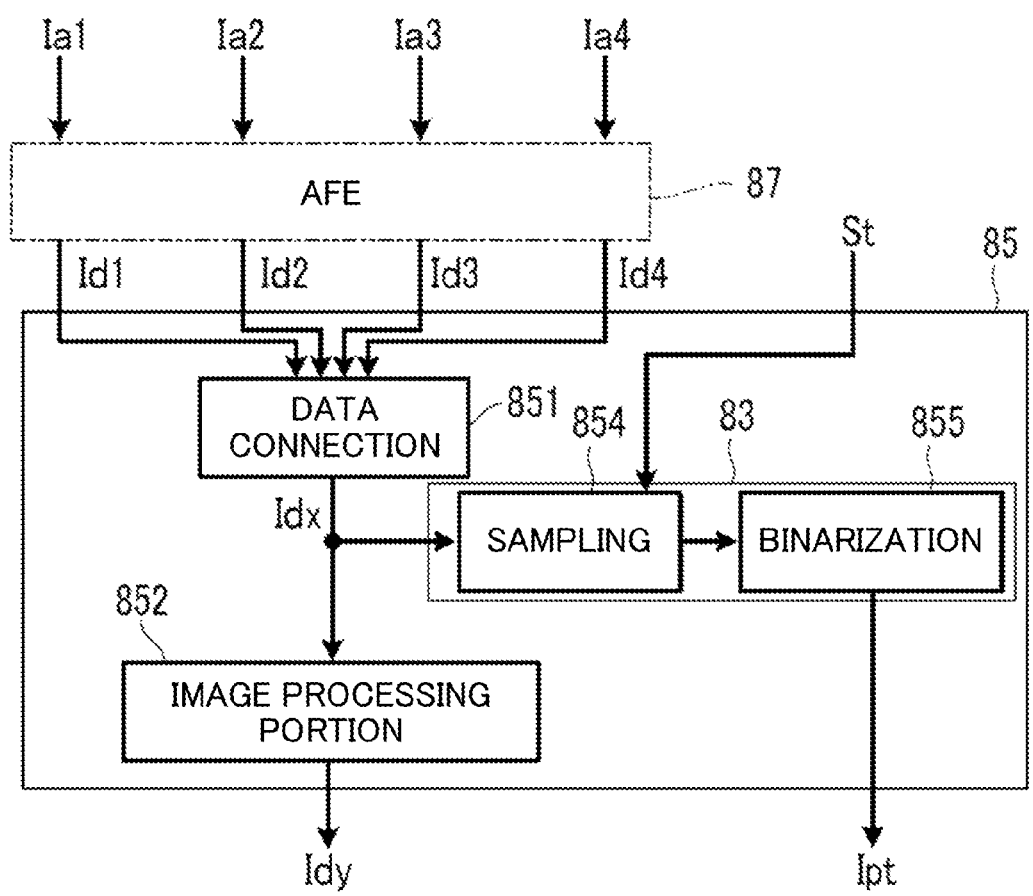
FIG. 5 is a block diagram of a scanning data processing portion of the image reading device according to the embodiment of the present disclosure.

The scanning data processing portion 85 performs various processes on the secondary image data Id acquired through the AFE 87. As shown in FIG. 5, the scanning data processing portion 85 includes a data connection portion 851 and an image processing portion 852. In FIG. 5, the AFE 87 is shown by a virtual line (alternate long and two short dashes line).

For example, each of the scanning data processing portion 85 and the AFE 87 may be composed of an application specific integrated circuit (ASIC), a digital signal processor (DSP), or the like.

The data connection portion 851 connects the secondary image partial data Id1 to Id4 and thereby outputs the obtained image data for the entire main-scanning area A0. Hereinafter, the image data for the entire main-scanning area A0 outputted by the data connection portion 851, that is, digital detection data for the entire main-scanning area A0, is referred to as secondary image data Idx.

The image processing portion 852 performs various kinds of image processing on the image data for the entire main-scanning area A0 acquired from the data connection portion 851. For example, the image processing portion 852 performs known image processing such as a shading correction process, a process of conversion from light amount-equivalent data to density-equivalent data, and gamma correction.

The laser control portion 86 controls the intensity of the laser light of the optical scanning portion 5 in accordance with density information of each pixel in tertiary image data Idy resulting from the image processing by the scanning data processing portion 85. Accordingly, an electrostatic latent image corresponding to the tertiary image data Idy is formed on the surface of the photosensitive member 41. That is, the image forming portion 4 forms an image corresponding to the detection data acquired by the image reading device 1, on the recording medium 9.

In the present embodiment, the primary image partial data Ia1 to Ia4 and the secondary image partial data Id1 to Id4 are an example of detection data of the respective single-channel light amount sensors 1331 to 1334. The secondary image partial data Id1 to Id4 are detection data outputted from the single-channel light amount sensors 1331 to 1334 through the AFE 87.

Meanwhile, it is conceivable that a situation where a module of the image sensor 13 that is a CIS module having a plurality of channels is replaced is normally a situation where the image sensor 13 is abnormal, and is also a situation where another component related to the image sensor 13 is abnormal.

Therefore, when the module of the image sensor 13 is replaced, if a portion other than the replaced module is abnormal, it is desirable to be able to recognize the abnormal portion.

If the image reading device 1 is adopted, when the image sensor 13 having the plurality of channels is replaced, it is possible to recognize an abnormal portion other than the replacement target. The details thereof will be described below.

[Details of Image Reading Device]

When the module including the image sensor 13 is replaced, the image reading device 1 performs the image sensor test process of causing the image sensor 13 after the replacement to operate under a plurality of predetermined test operation conditions. The image reading device 1 has a function to perform a type determination process and an abnormality determination process on the basis of detection data of the image sensor 13 after the replacement which detection data is acquired under the test operation conditions in the image sensor test process.

The type determination process is a process of determining the type of the image sensor 13 after the replacement. The abnormality determination process is a process of determining whether a portion other than the module of the image sensor 13 is abnormal.

The respective test operation conditions are operation conditions that are different in the resolution for reading of the image in the main-scanning area A0. Operation of the image sensor 13 under the test operation conditions is executed in a state where the document 90 is not present in the main-scanning area A0. Therefore, the primary image data Ia and the secondary image data Id and Idx acquired under the test operation conditions are the detection data for the reference surface 140.

In the present embodiment, the image sensor control portion 84 of the control portion 8 causes the image sensor 13 after the replacement to operate under each of the two test operation conditions. The first test operation condition is to cause the image sensor 13 to operate in the standard resolution mode, and the second test operation condition is to cause the image sensor 13 to operate in the half resolution mode.

In the image sensor test process, the AFE 87 and the scanning data processing portion 85 perform a test data acquisition process of acquiring the detection data at each channel from the image sensor 13 after the replacement, under each test operation condition.

When the image sensor 13 is replaced, the number of the channels and the resolution at each channel may be different between the image sensors 13 before and after the replacement. Therefore, in the test data acquisition process, the AFE 87 and the scanning data processing portion 85 acquire the detection data under each test operation condition according to a data acquisition procedure through which the detection data at each of the channels the number of which is a predetermined maximum number can be acquired.

Hereinafter, the case where candidates for the image sensor 13 that can be mounted on the image reading device 1 are the following three types, will be described. In a first candidate Tp1, the number of the channels is four, and the number of pixels at each channel in the standard resolution mode is 2000 pixels. In a second candidate Tp2, the number of the channels is four, the number of pixels at each of three of the channels in the standard resolution mode is 2300 pixels, and the number of pixels at the remaining one channel in the standard resolution mode is 1100 pixels. In a third candidate Tp3, the number of the channels is three, and the number of pixels at each channel in the standard resolution mode is 2700 pixels. These three candidates are different in the number of the channels or the number of pixels at each channel.

In the case where the candidates for the image sensor 13 that can be mounted on the image reading device 1 are the three candidates described above, the AFE 87 and the scanning data processing portion 85 acquire the detection data under each test operation condition, in the test data acquisition process, according to a data acquisition procedure through which the detection data at four channels can be acquired.

For example, the AFE 87 and the scanning data processing portion 85 acquire the image data at the maximum channel of the candidate in the test data acquisition process, and the number of pixels at the time of image data acquisition is the number of pixels with which the resolution is the highest, regardless of the resolution setting at the time of operation. Here, in the test data acquisition process, the AFE 87 and the scanning data processing portion 85 acquire the detection data under each test operation condition through a procedure through which image data of 2000 pixels at each of four channels Ch0 to Ch3 are acquired.

Figure 6A:
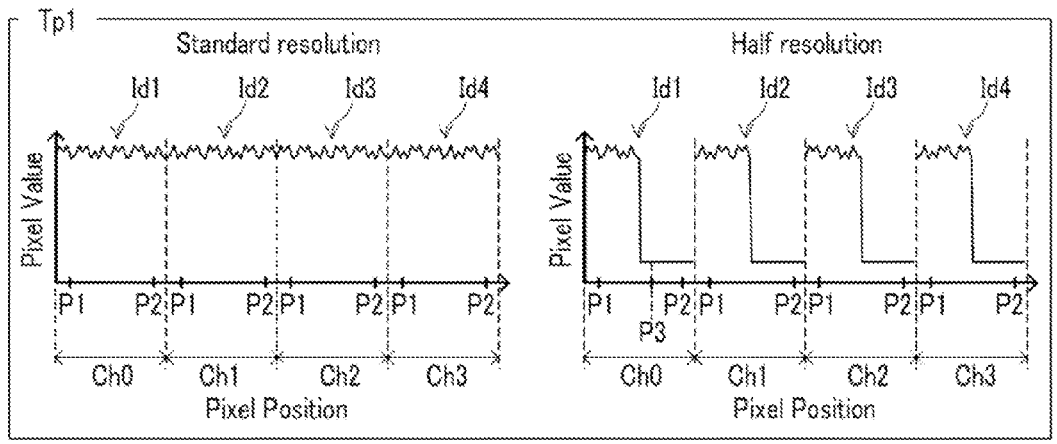
FIG. 6A is graphs representing an example of a distribution of image data acquired by causing a first candidate image sensor to operate under a plurality of operation conditions.
Figure 6B:
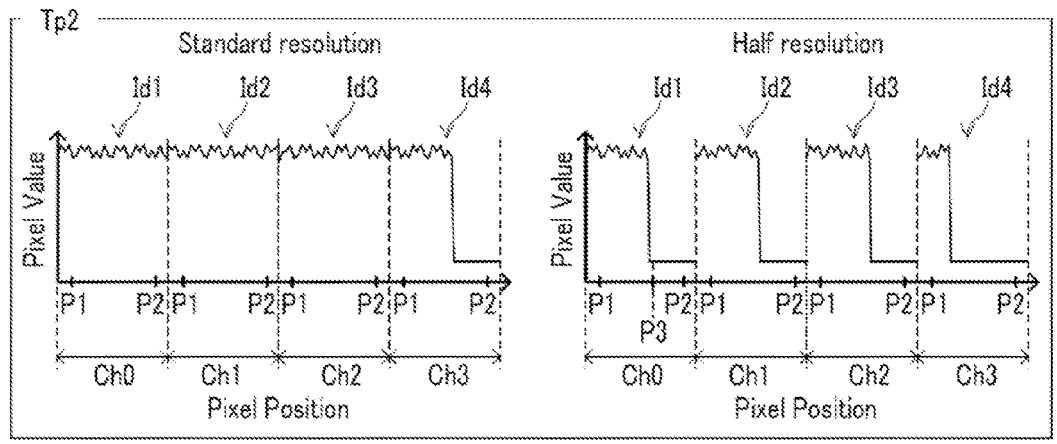
FIG. 6B is graphs representing an example of a distribution of image data acquired by causing a second candidate image sensor to operate under the plurality of operation conditions.
Figure 6C:
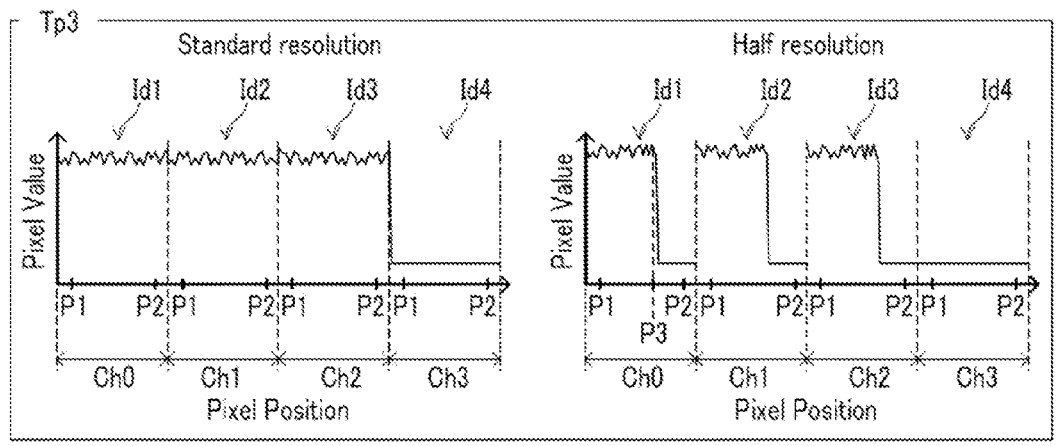
FIG. 6C is graphs representing an example of a distribution of image data acquired by causing a third candidate image sensor to operate under the plurality of operation conditions.

FIGS. 6A to 6C are graphs each representing an example of a distribution of standard secondary image data Id acquired by causing each of the first candidate Tp1, the second candidate Tp2, and the third candidate Tp3 to operate under each of the two operation conditions. FIG. 6A shows data of the first candidate Tp1, FIG. 6B shows data of the second candidate Tp2, and the FIG. 6C shows data of the third candidate Tp3.

In FIGS. 6A to 6C, each of the left graphs represents a distribution of each of the secondary image partial data Id1 to Id4 acquired under the first test operation condition (in the standard resolution mode), and each of the right graphs represents a distribution of each of the secondary image partial data Id1 to Id4 acquired under the second test operation condition (in the half resolution mode).

In the image reading device 1, the storage portion 82 stores in advance standard distribution data D1 for each of the first candidate Tp1, the second candidate Tp2, and the third candidate Tp3. Each standard distribution data D1 is data representing a standard distribution state of the secondary image data Id at each of the channels Ch0 to Ch3 under each of the test operation conditions. Each standard distribution data D1 is associated with identification information D11 of each of the three candidates for the image sensor 13.

The standard distribution data D1 is an example of standard distribution information that is associated with each of a plurality of types of the image sensors 13 and represents a standard distribution state of data at each of the channels under each of the test operation conditions. The storage portion 82 is an example of a standard distribution information storage portion that stores the standard distribution information.

The standard distribution data D1 in the present embodiment is data representing a permutation of binary data corresponding to a plurality of predetermined detection positions P1 to P3 at each of the channels Ch0 to Ch3 under each of the test operation conditions.

FIG. 7 represents an example of the standard distribution data D1. The standard distribution data D1 shown in FIG. 7 corresponds to the standard secondary image data Id of the respective three candidates shown in FIGS. 6A to 6C. In FIG. 7 and other drawings, the binary data is represented by "1" or "0" on the basis of whether the detection data exceeds a predetermined threshold.

Other than the case where the binary data at each of the detection positions P1 to P3 is data obtained by binarizing one pixel data at each of the detection positions P1 to P3, the binary data at each of the detection positions P1 to P3 may be data obtained by binarizing a representative value of a plurality of pixel data at each of the detection positions P1 to P3. For example, the representative value is an average value, a minimum value, a maximum value, or the like.

In the example shown in FIGS. 6A to 6C and 7, the standard distribution data D1 includes the binary data at the first detection position P1 and the binary data at the second detection position P2 in the respective secondary image partial data Id1 to Id4 under each of the first test operation condition (the standard resolution mode) and the second test operation condition (the half resolution mode).

Furthermore, in the example shown in FIGS. 6A to 6C and 7, the standard distribution data D1 also includes the binary data at the third detection position P3 between the first detection position P1 and the second detection position P2 in the secondary image partial data Id1 at the one channel Ch0 under the second test operation condition (the half resolution mode).

Here, a position corresponding to pixel data outputted initially at each of the channels Ch0 to Ch3 when the image sensor 13 outputs the primary image data Ia is referred to as a proximal end position, and a position opposite to this position is referred to as a distal end position.

Figure 8:
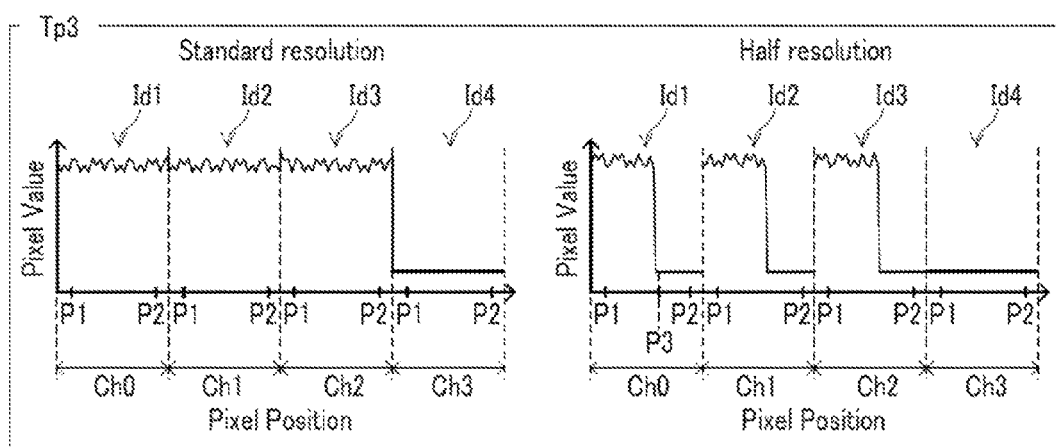
FIG. 8 is graphs representing an example of a distribution of image data acquired when a portion other than the image sensor in the image reading device is abnormal.

In the example shown in FIG. 8, the third detection position P3 is close to a midpoint between the proximal end position and the distal end position in the partial scanning area A01 and is a position at the distal end position side from the midpoint.

As shown in FIG. 5, the scanning data processing portion 85 of the image reading device 1 includes a test distribution data generation portion 83 in addition to the data connection portion 851 and the image processing portion 852. The test distribution data generation portion 83 includes a sampling portion 854 and a binarization portion 855.

When the image sensor 13 operates under each of the test operation conditions, the test distribution data generation portion 83 generates test distribution data Ipt from the detection data of the image sensor 13. The test distribution data Ipt is data representing a distribution state of the detection data at each of the channels of the image sensor 13.

In the present embodiment, the test distribution data generation portion 83 generates the test distribution data Ipt from the secondary image data Idx that is the connected detection data outputted by the data connection portion 851. The test distribution data Ipt is data representing a distribution state of the detection data at each of the channels acquired under each of the test operation conditions.

The test distribution data Ipt in the present embodiment represents a permutation of data obtained by binarizing the detection data corresponding to the plurality of detection positions P1 to P3 at each of the channels, the detection data being acquired under each of the test operation conditions.

In the test distribution data generation portion 83, the sampling portion 854 samples a part of the data at each of the channel in the secondary image data Idx. When the image sensor 13 after the replacement operates under the first test operation condition (in the standard resolution mode), the sampling portion 854 in the present embodiment samples data at the first detection position P1 and the second detection position P2 in the respective secondary image partial data Id1 to Id4 at all the channels. Furthermore, when the image sensor 13 after the replacement operates under the second test operation condition (in the half resolution mode), the sampling portion 854 samples the data at the first detection position P1, the second detection position P2, and the third detection position P3 in the secondary image partial data Id1 at the initial channel and the data at the first detection position P1 and the second detection position P2 in the respective secondary image partial data Id2 to Id4 at the other three channels.

Furthermore, the binarization portion 855 of the test distribution data generation portion 83 generates the test distribution data Ipt by binarizing the respective data sampled by the sampling portion 854.

If the image sensor 13 and a portion related to the image sensor 13 are normal, the test distribution data Ipt acquired through the image sensor test process matches any one of the standard distribution data D1. Therefore, the type of the image sensor 13 can be identified by collation of the test distribution data Ipt and the respective standard distribution data D1.

In general, when the image sensor 13 is replaced, an image sensor 13 normal operation of which has been verified is mounted onto the image reading device 1. Therefore, in most cases, the image sensor 13 itself after the replacement can be normal.

Therefore, when the image sensor test process is performed in combination with replacement of the image sensor 13, if collation of the test distribution data Ipt and the respective standard distribution data D1 is not successful, a portion other than the image sensor 13 can be regarded as being abnormal.

FIG. 8 is graphs representing an example of a distribution of image data acquired through the image sensor test process when a related portion other than the image sensor 13 in the image reading device 1 is abnormal. FIG. 9 shows the test distribution data Ipt generated from the image data shown in FIG. 8.

The example shown in FIGS. 8 and 9 is an example of the case where a portion related to the fourth channel Ch3 is abnormal in a state where the image sensor 13 that is the second candidate Tp2 is mounted on the image reading device 1.

In a state where the normal image sensor 13 that is the second candidate Tp2 is mounted, if the portion related to the fourth channel Ch3 is abnormal, the test distribution data Ipt shown in FIG. 9 is acquired through the image sensor test process.

In addition, in a state where the image sensor 13 that is the third candidate Tp3 is mounted, if the portion related to the fourth channel Ch3 is abnormal, the test distribution data Ipt acquired through the image sensor test process does not match the data shown in FIG. 9.

Therefore, in the case where data at the time of an abnormality as shown in FIG. 9 is registered in advance, an abnormal portion can be identified by collation of the test distribution data Ipt and the registered data at the time of the abnormality.

In the present embodiment, the storage portion 82 of the image reading device 1 stores in advance abnormal distribution data D2 corresponding to each of a plurality of abnormal portions other than the image sensor 13.

Figure 10:
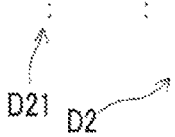
FIG. 10 is a diagram representing an example of abnormal distribution data stored in advance in the image reading device according to the embodiment of the present disclosure.

FIG. 10 represents an example of the abnormal distribution data D2. The abnormal distribution data D2 shown in FIG. 10 corresponds to the secondary image data Id in the case where a portion related to any one of the four channels Ch0 to Ch3 of the image sensor 13 is abnormal in a state where any one of the three candidates shown in FIGS. 6A to 6C is mounted.

Each abnormal distribution data D2 is data representing an abnormal distribution state of the secondary image data Id at each of the channels Ch0 to Ch3 under each of the test operation conditions. Each abnormal distribution data D2 is associated with identification information D21 of each of the plurality of abnormal portions other than the image sensor 13.

In the example shown in FIG. 10, the identification information D21, "00", "01", "02", and "03", represent abnormal portions, other than the image sensor 13, related to the respective channels Ch0, Ch1, Ch2, and Ch3 of the image sensor 13, respectively.

The abnormal portions other than the image sensor 13 may be, for example, wires or electronic components on output paths for the respective primary image partial data Ia1 to Ia4 at the respective channels Ch0 to Ch3.

The abnormal distribution data D2 is an example of abnormal distribution information that is associated with each of the plurality of abnormal portions other than the image sensor 13 and represents an abnormal distribution state of data at each of the channels under each of the test operation conditions. In addition, the storage portion 82 is an example of an abnormal distribution information storage portion that stores the abnormal distribution information.

[Image Sensor Test Process]

Figure 11:
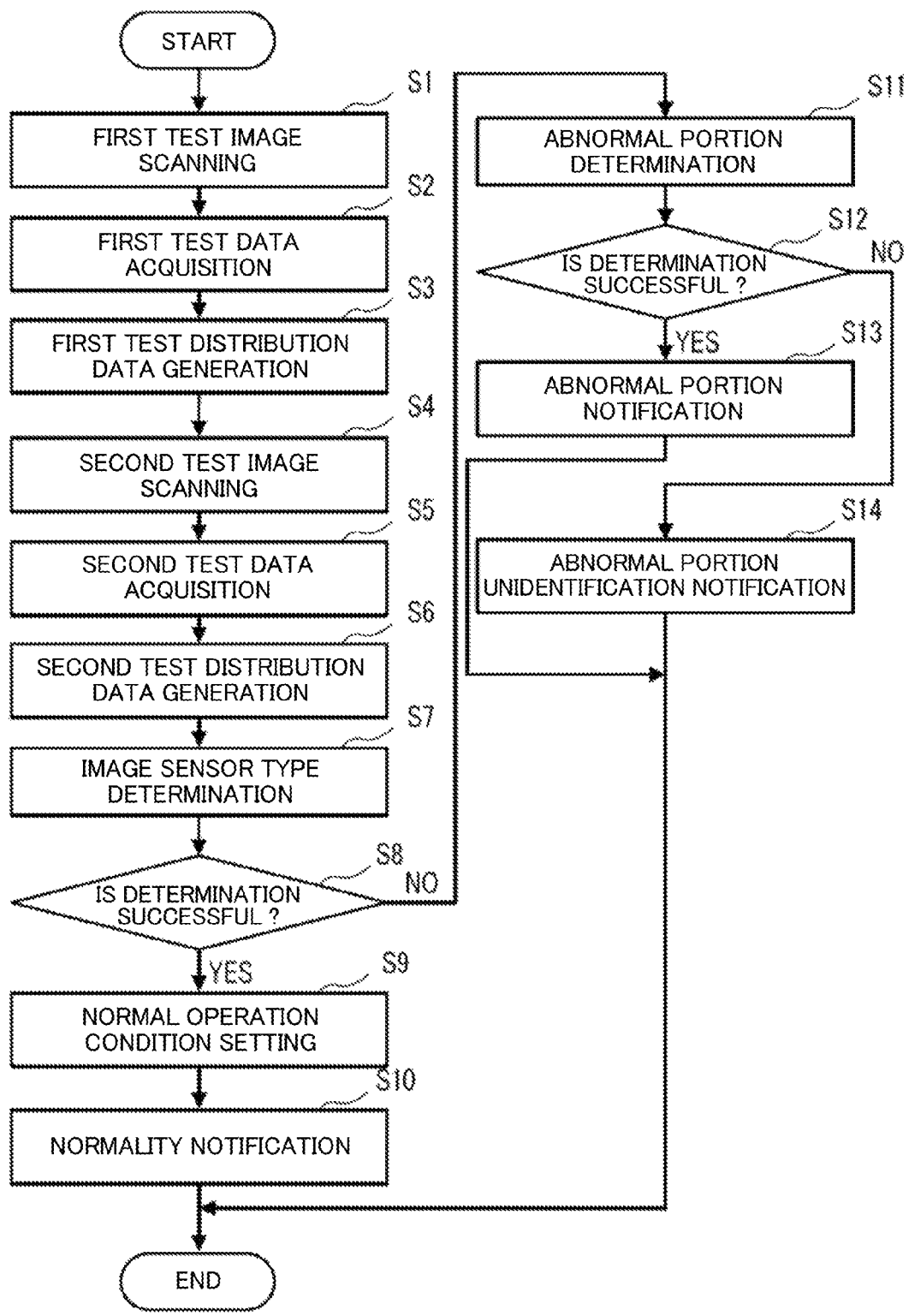
FIG. 11 is a flowchart representing an example of an image sensor evaluation process in the image reading device according to the embodiment of the present disclosure.

Next, an example of a procedure of the image sensor test process will be described with reference to a flowchart in FIG. 11. In the following description, S1, S2, . . . represent identification characters for respective steps executed by the control portion 8.

The MPU 81 determines whether a predetermined test start condition is satisfied. If the test start condition is satisfied, the MPU 81 starts the image sensor test process. For example, the test start condition is that a predetermined test start operation is performed on the operation display portion 80.

The test start operation is an operation that is performed when one of or both the first image sensor 13a and the second image sensor 13b are replaced, and is a special operation that is not performed when the user normally uses the image reading device 1. The special operation is, for example, an operation of keeping pressing a plurality of predetermined operation buttons simultaneously, or an operation of inputting a predetermined password.

The test start operation may include an operation of designating one of or both the first image sensor 13a and the second image sensor 13b, that is, an operation of designating the replacing image sensor 13. In this case, the image sensor test process is performed only for the designated image sensor 13.

If the image sensor 13 is not designated in the test start operation, the image sensor test process may be performed for both the first image sensor 13a and the second image sensor 13b.

<Step S1>

In the image sensor test process, first, the test control portion 842 of the image sensor control portion 84 performs a first test image scanning process. The first test image scanning process is a process of causing the image sensor 13 to operate under the first test operation condition in a state where the document 90 is not present in the main-scanning area A0.

In the present embodiment, in step S1, the test control portion 842 outputs the mode signal Md for designating image reading in the standard resolution mode, to the image sensor 13, and then causes the image sensor 13 to operate. At this time, the test control portion 842 may cause the light-emitting portions 131 of all the colors to emit light and may cause the light amount sensor 133 to operate in the standard resolution mode.

<Step S2>

Furthermore, the AFE 87 and the scanning data processing portion 85 perform a first test data acquisition process. The first test data acquisition process is a process of acquiring the detection data at each of the channels from the image sensor 13 operating in the first test operation condition. The data acquired in step S2 is the secondary image data Idx.

<Step S3>

Furthermore, the test distribution data generation portion 83 generates a first half part of the test distribution data Ipt from the secondary image data Idx acquired in step S2. The generated data is temporarily stored into a non-transitory computer-readable storage portion that is included in the scanning data processing portion 85 and not shown.

<Step S4>

Subsequently, the test control portion 842 of the image sensor control portion 84 performs a second test image scanning process. The second test image scanning process is a process of causing the image sensor 13 to operate under the second test operation condition in a state where the document 90 is not present in the main-scanning area A0.

In the present embodiment, in step S4, the test control portion 842 outputs the mode signal Md for designating image reading in the half resolution mode, to the image sensor 13, and then causes the image sensor 13 to operate. At this time, the test control portion 842 may cause the light-emitting portions 131 of all the colors to emit light and may cause the light amount sensor 133 to operate in the half resolution mode.

As described above, the test control portion 842 of the image sensor control portion 84 causes the image sensor 13 to operate under a plurality of the test operation conditions that are different in resolution, in a state where the document 90 is not present in the main-scanning area A0 (S1, S4).

<Step S5>

Furthermore, the AFE 87 and the scanning data processing portion 85 perform a second test data acquisition process. The second test data acquisition process is a process of acquiring the detection data at each of the channels from the image sensor 13 operating in the second test operation condition. The data acquired in step S5 is the secondary image data Idx.

In steps S2 and S5, the AFE 87 and the scanning data processing portion 85 acquire the secondary image data Idx under the respective test operation conditions according to a data acquisition procedure through which the secondary image data Idx of the same number of pixels at the channels the number of which is a predetermined maximum number can be acquired.

In the case where the standard distribution data D1 corresponding to FIGS. 6A to 6C and 7 is adopted, the AFE 87 and the scanning data processing portion 85 acquire the secondary image data Idx under each of the test operation conditions according to a procedure through which image data of 2000 pixels at the respective four channels Ch0 to Ch3 are acquired.

<Step S6>

Furthermore, the test distribution data generation portion 83 generates a second half part of the test distribution data Ipt from the secondary image data Idx acquired in step S5. The generated data is temporarily stored into the non-transitory computer-readable storage portion that is included in the scanning data processing portion 85 and not shown. Moreover, the test distribution data generation portion 83 stores, into the storage portion 82, the test distribution data Ipt obtained by connecting the distribution data acquired in step S3 and the distribution data acquired in step S6.

<Step S7>

Next, the MPU 81 determines the type of the image sensor 13 by collating the test distribution data Ipt with the respective standard distribution data D1. That is, the MPU 81 identifies the identification information D11 of the type of the image sensor 13 associated with the standard distribution data D1 that matches the test distribution data Ipt.

As described above, the test distribution data Ipt represents a distribution state of the detection data at each of the channels acquired under each of the test operation conditions. Each standard distribution data D1 represents a standard distribution state of data at each of the channels under each of the test operation conditions, and is associated with each of a plurality of types of the image sensors 13.

<Step S8>

Furthermore, the MPU 81 selects a process to be performed next, in accordance with whether the determination as to the type of the image sensor 13 is successful.

The processes in steps S7 and S8 are performed by the MPU 81 executing a type determination program Pr1. The MPU 81 executing the type determination program Pr1 is an example of a type determination portion that determines the type of the image sensor 13.

<Step S9>

If the determination as to the type of the image sensor 13 is successful, the normal control portion 841 of the image sensor control portion 84 sets a normal operation condition for the image sensor 13 corresponding to the determined type of the image sensor 13. The set normal operation condition is stored into a non-transitory computer-readable storage portion that is included in the storage portion 82 or the image sensor control portion 84 and not shown.

For example, normal operation condition information D3 may be stored in the storage portion 82 in advance. The normal operation condition information D3 is information in which the identification information D11 of each of the candidates for the image sensor 13 is associated with information concerning the normal operation condition suitable for the candidate.

If the determination as to the type of the image sensor 13 is successful, the MPU 81 may refer to the normal operation condition information D3 and may transfer the information for identifying the normal operation condition corresponding to the determined type of the image sensor 13, to the image sensor control portion 84. In this case, in accordance with the transferred information for the normal operation condition, the normal control portion 841 sets a condition for causing the image sensor 13 to operate when the image of the document 90 is read.

The normal control portion 841 performing the process in step S9 is an example of an operation condition setting portion that sets the normal operation condition for the image sensor 13 in accordance with the type of the image sensor 13 determined in step S7.

<Step S10>

Furthermore, if the determination as to the type of the image sensor 13 is successful, the MPU 81 performs a process of issuing a notification indicating that the image sensor 13 and the portion related to the image sensor 13 are normal. For example, the MPU 81 issues the notification indicating that the image sensor 13 and the portion related to the image sensor 13 are normal, via the operation display portion 80. At this time, information concerning the type of the image sensor 13 may be included in the notification indicating that the image sensor 13 and the portion related to the image sensor 13 are normal. Upon end of step S10, the image sensor test process ends.

<Step S11>

On the other hand, if the determination as to the type of the image sensor 13 is not successful, the MPU 81 determines an abnormal portion other than the image sensor 13 by collating the test distribution data Ipt with the abnormal distribution data D2. That is, the MPU 81 identifies the identification information D21 of the abnormal portion associated with the abnormal distribution data D2 that matches the test distribution data Ipt.

The process in step S11 is performed by the MPU 81 executing an abnormality determination program Pr2. The MPU 81 executing the abnormality determination program Pr2 is an example of an abnormality determination portion that determines the abnormal portion.

<Step S12>

Furthermore, the MPU 81 selects a process to be performed next, in accordance with whether the determination as to the abnormal portion is successful.

<Step S13>

If the determination as to the abnormal portion is successful, the MPU 81 performs a process of notifying the determination result of the abnormal portion. For example, the MPU 81 notifies information indicating the abnormal portion, via the operation display portion 80. Upon end of step S13, the image sensor test process ends.

<Step S14>

On the other hand, if both the determination as to the type of the image sensor 13 and the determination as to the abnormal portion are not successful, the MPU 81 performs a process of issuing a notification indicating that the portion related to the image sensor 13 is abnormal but the abnormal portion is unidentified. For example, the MPU 81 issues a notification indicating that the abnormal portion is unidentified, via the operation display portion 80. Upon end of step S14, the image sensor test process ends.

The processes in steps S13 and S14 are performed by the MPU 81 executing an abnormality notification program Pr3. The MPU 81 executing the abnormality notification program Pr3 is an example of an abnormality notification portion that notifies an abnormality of another device related to the image sensor 13 if the test distribution data Ipt does not match any standard distribution data D1.

In the image reading device 1 and the image forming apparatus 10 including the image reading device 1, when the image sensor 13 having the plurality of channels is replaced, it is possible to recognize an abnormal portion other than the image sensor 13.

Since the abnormal portion is determined by collation of the test distribution data Ipt and the abnormal distribution data D2, it is possible to recognize a more detailed abnormal situation.

In the present embodiment, the test distribution data Ipt, the standard distribution data D1, and the abnormal distribution data D2 are each data representing a permutation of binary data corresponding to each of the plurality of predetermined detection positions at each of the channels under each of the test operation conditions. In this case, the load of the data collation process is low, and the determination as to the type of the image sensor 13 and the determination as to the abnormal portion can be performed simply at a high speed.

If the determination as to the type of the image sensor 13 is successful, the normal operation condition for the image sensor 13 is automatically set in accordance with the automatically determined type of the image sensor 13. Thus, time and effort of a maintenance operator are saved. Furthermore, the maintenance operator can be prevented from wrongly setting the normal operation condition.

APPLICATION EXAMPLES

In the image sensor test process of the image reading device 1 described above, under each of the test operation conditions, the image sensor control portion 84 may cause the plurality of the light-emitting portions 131 having different colors to emit light in order. In this case, the image sensor control portion 84 causes the light amount sensor 133 to operate, per emission color.

Then, the MPU 81 executing the abnormality determination program Pr2 determines whether a majority vote abnormality condition is satisfied. The majority vote abnormality condition is that two of the three test distribution data Ipt acquired for the respective emission colors of the light-emitting portions 131 have the same contents, and the remaining one is different in content from the other two.

If the majority vote abnormality condition is satisfied, the MPU 81 determines that a portion related to the light-emitting portion 131 of the color corresponding to the test distribution data Ipt indicating the content different from those of the other two is abnormal.

The image reading device and the image forming apparatus according to the present disclosure can be configured by freely combining the embodiments and application examples described above, or modifying or partially omitting the embodiments and the application examples as appropriate, within the scope of the invention recited in each claim.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
an image sensor capable of emitting light to a main-scanning area along one straight line and outputting detection data of an amount of received light from each of a plurality of partial scanning areas each forming a part of the main-scanning area at an individual channel for each of the partial scanning area;
a color reference portion having a reference surface that is formed along the main-scanning area and has a predetermined color;
a test control portion configured to cause the image sensor to operate under a plurality of test operation conditions different in resolution, in a state where a document is not present in the main-scanning area;
a standard distribution information storage portion configured to store standard distribution information that is associated with each of a plurality of types of the image sensors and represents a standard distribution state of data at each of the channels under each of the test operation conditions;
a type determination portion configured to determine a type of the image sensor by collating the standard distribution information with a distribution state of the detection data at each of the channels acquired under each of the test operation conditions; and
an abnormality notification portion configured to notify an abnormality of another device related to the image sensor if the distribution state of the detection data at each of the channels acquired under each of the test operation conditions does not match any of the standard distribution information, wherein
the standard distribution information represents a distribution state of detection data outputted from each of channels of a normal image sensor when the normal image sensor is operated under the plurality of test operation conditions different in resolution, in the state where a document is not present in the main-scanning area.

2. The image reading device according to claim 1, further comprising:
an abnormal distribution information storage portion configured to store abnormal distribution information that is associated with each of a plurality of abnormal portions other than the image sensor and represents an abnormal distribution state of data at each of the channels under each of the test operation conditions; and
an abnormality determination portion configured to determine the abnormal portion by collating the abnormal distribution information with the distribution state of the detection data at each of the channels acquired under each of the test operation conditions, wherein
the abnormality notification portion notifies a result of the determination as to the abnormal portion.

3. The image reading device according to claim 2, wherein
the abnormal distribution information represents a permutation of binary data corresponding to each of a plurality of predetermined detection positions at each of the channels under each of the test operation conditions, and
the abnormality determination portion collates the abnormal distribution information with a permutation of data obtained by binarizing the detection data corresponding to each of the plurality of detection positions at each of the channels, the detection data being acquired under each of the test operation conditions.

4. The image reading device according to claim 1, wherein
the standard distribution information represents a permutation of binary data corresponding to each of a plurality of predetermined detection positions at each of the channels under each of the test operation conditions, and the type determination portion collates the standard distribution information with a permutation of data obtained by binarizing the detection data corresponding to each of the plurality of detection positions at each of the channels, the detection data being acquired under each of the test operation conditions.

5. The image reading device according to claim 1, wherein the standard distribution information represents the standard distribution state associated with each of a plurality of types of the image sensors different in at least a number of the channels or a number of pixels at each of the channels.

6. The image reading device according to claim 1, further comprising an operation condition setting portion configured to set a normal operation condition for the image sensor in accordance with the determined type of the image sensor.

7. An image forming apparatus comprising:

the image reading device according to claim 1, and an image forming portion configured to form an image corresponding to the detection data acquired by the image reading device, on a recording medium.

* * * * *